United States Patent
Watanabe et al.

(10) Patent No.: US 6,429,159 B1
(45) Date of Patent: Aug. 6, 2002

(54) STRETCHABLE ADHESIVE NONWOVEN FABRIC AND LAMINATE CONTAINING THE SAME

(75) Inventors: Noboru Watanabe, Sabae; Tsutomu Teshima; Yukio Yamakawa, both of Hofu; Yutaka Tanaka, Osaka; Teruyoshi Kawada, Hofu, all of (JP)

(73) Assignees: Kanebo Limited, Tokyo; Kanebo Gohsen, Limited, Osaka, both of (JP)

( * ) Notice: Subject to any disclaimer, the term of this patent is extended or adjusted under 35 U.S.C. 154(b) by 0 days.

(21) Appl. No.: 09/600,549

(22) PCT Filed: Jan. 25, 1999

(86) PCT No.: PCT/JP99/00306
§ 371 (c)(1),
(2), (4) Date: Jul. 19, 2000

(87) PCT Pub. No.: WO99/39037
PCT Pub. Date: Aug. 5, 1999

(30) Foreign Application Priority Data

Jan. 28, 1998 (JP) ............................................ 10-015589

(51) Int. Cl.$^7$ ............................ D04H 5/06; C08G 18/81
(52) U.S. Cl. ...................... 442/329; 442/328; 442/329; 428/221; 528/45
(58) Field of Search ................................. 428/221, 339, 428/411.1, 500, 537.5, 423.1, 423.3, 423.7; 156/106, 60, 272.2, 283; 524/1, 500; 528/45, 59, 67, 367; 442/328, 329, 334, 381, 394, 414

(56) References Cited

U.S. PATENT DOCUMENTS 4,223,101 A * 9/1980 Fine et al. ..................... 264/10
5,298,303 A * 3/1994 Kerr et al. ............... 206/524.2
5,906,704 A * 5/1999 Matsuura et al. ........ 156/331.4

* cited by examiner

Primary Examiner—James J. Seidleck
Assistant Examiner—Travis B Ribar
(74) Attorney, Agent, or Firm—Morgan & Finnegan, LLP

(57) ABSTRACT

The present invention is directed to a stretchable adhesive nonwoven prepared by laminating continuous filaments made of a thermoplastic polyurethane resin, which comprises an aliphatic diisocyanate and/or an aromatic diisocyanate, a polymeric diol and a chain-extending agent and has a hardness (JIS-A hardness) of 65 to 98 degree and a flow initiating temperature within a range from 80 to 150° C., into a sheet, and fusion-bonding the filaments themselves with their own heat at the contact point of the laminated filaments thereby to form fibers, and a laminate containing the same. The adhesive nonwoven fabric of the present invention is rich in flexibility and is excellent in adhesion and air permeability.

7 Claims, No Drawings

STRETCHABLE ADHESIVE NONWOVEN FABRIC AND LAMINATE CONTAINING THE SAME

TECHNICAL FIELD

The present invention relates to a stretchable adhesive nonwoven fabric having an excellent adhesive strength as well as air permeability and flexibility.

BACKGROUND ART

A hot-melt nonwoven fabric is used to laminate the nonwoven fabric with the adherend, and fuse the nonwoven fabric with heating to bond it. As the hot-melt nonwoven fabric, those made of a resin such as ethylene-vinyl acetate copolymer (EVA), polyethylene-atactic polypropylene (APP), ethylene-ethyl acrylate copolymer (EEA), polyamide, polyester or the like has hitherto been known.

The resin constituting the hot-melt nonwoven fabric is incorporated with plasticizers, tackifiers and waxes, and is put into practice to improve various performances which are generally required for use as an adhesive material. However, such a nonwoven fabric is poor in chemical resistance, thermal resistance, cleaning resistance and flexibility causing impairment of laminates to cause a problem that the pleasant feel to the touch of the laminate is drastically impaired.

As a method of solving these problems, for example, a method of forming a thermoplastic polyurethane resin into a film and using the film as an adhesive material has been disclosed in Unexamined Patent Publication (Kokai) Nos. 7-97560 and 9-221640.

However, the film made of the thermoplastic polyurethane resin causes a problem air permeability of the laminate is drastically lowered or completely lost.

An object of the present invention is to solve these problems of previously known arts and provide a stretchable adhesive nonwoven fabric, which is rich in flexibility and is excellent in adhesive properties and air permeability.

DESCRIPTION OF THE INVENTION

The present inventors have intensely studied to solve these previous problems. As a result, they have made an invention relating to a stretchable adhesive nonwoven fabric prepared by laminating continuous filaments made of a thermoplastic polyurethane resin, which comprises an aliphatic diisocyanate and/or an aromatic diisocyanate, a polymeric diol and a chain-extending agent and has a hardness (JIS-A hardness) of 65 to 98 degrees and a flow initiating temperature within a range from 80 to 150° C., into a sheet, and fusion-bonding the filaments themselves with their own heat at the contact point of the laminated filaments thereby to form fibers.

BEST MODE FOR CARRYING OUT THE INVENTION

The aliphatic diisocyanate used in the present invention is preferably an aliphatic diisocyanate having 4 to 13 carbon atoms. Examples thereof include straight-chain diisocyanates such as 1,4-tetramethylene diisocyanate, 1,5,-pentamethylene diisocyanate, 1,6-hexamethylene diisocyanate, 1,8-octamethylene diisocyanate and isophorone diisocyanate; and alicyclic diisocyanates such as cyclohexane diisocyanate, dicyclohexylmethane diisocyanate, hydrogenated xylene diisocyanate, norbornane-diisocyanate methyl. An aliphatic diisocyanate having a methyl side chain in a molecule, for example, trimethyl-hexamethylene diisocyanate, methylbutane diisocyanate, methylpentane diisocyanate or the like is also preferably used.

They can be used alone or in combination with the above diisocyanates having no side chain.

Examples of the aromatic diisocyanate used in the present invention include 2,4-torilene diisocyanate, 4,4'-diphenylmethane diisocyanate, xylylene diisocyanate, phenylene diisocyanate, 1,5-naphthalene diisocyanate or the like.

The polymeric diol used in the present invention include, for example, polymeric diol having no side chain such as polyester diol prepared from various straight-chain low monomeric diols and dicarboxylic acids such as adipic acid, phthalic acid, sebacic acid and dimeric acid; polycaprolactonediol; carbonates of various glycols; and polyether diols such as polytetromethylene glycol.

Examples of the polymeric diol having a methyl side chain in a molecule include polyester diol prepared from side-chain diol alone, such as 2-methyl-1,3-propanediol, 2-methyl-1,4-butanediol, 2-methyl-1,5-hexanediol, 3-methyl-1,5-hexanediol, neopenthyl glycol, 3-methyl-1,5-pentanediol and 2-methyl-1,8-octanediol, or a mixture with straight-chain diol, and dicarboxylic acids; polyvalerolactonediols made of β-methyl-δ-valerolactone having a methyl side chain and the like. These compounds can be used alone or in combination with the above polymeric diols having no side chain. The number average molecular weight of these polymeric diols are within a range from 500 to 10,000, and preferably from 700 to 8,000.

The chain-extending agent used in the present invention includes, for example, a diol compound having a molecular weight of not more than 400. Specific compounds include ethylene glycol, diethylene glycol, 1,4-butanediol, 1,6-hexanedilo, 1,9-nonanediol, bis-β-hydroxyethoxybenzene and the like. There can also preferably be used side-chain diols such as 2-methyl-1,3-propanediol, 2-methyl-1,4-butanediol, 2-methyl-1,5-hexanediol, 3-methyl-1,5-hexanediol, neopenthyl glycol, 3-methyl-1,5-pentanediol, 2-methyl-1,8-octanediol, N-phenyldiisopropanolamine and the like. They can be used alone or in combination.

The thermoplastic polyurethane resin in the present invention is required to have a flow initiating temperature within a range from 80 to 150° C. When the flow initiating temperature is less than 80° C., it becomes difficult to prepare a nonwoven fabric by hot molding. On the other hand, when the flow initiating temperature excesses 150° C., the flexibility of the nonwoven fabric is lost and the temperature on bonding rises to cause discoloration of the adherend so that it becomes unsuitable for use as an adhesive material for clothing.

As used herein, the term "flow initiating temperature" refers to a temperature at which a resin initiates to melt and flow when heating at a constant heating rate. It is usually measured by, for example, a flow tester. The flow initiating temperature is an important physical property because it limits bonding conditions of a hot-melt nonwoven fabric adhesive material, especially heating temperature.

The hardness (JIS-A hardness) of the thermoplastic polyurethane resin of the present invention is required to be within a range from 65 to 98 degree. When the hardness is less than 65 degree, it becomes difficult to prepare a nonwoven fabric by heat molding. On the other hand, the hardness excesses 98 degree, the flexibility of the nonwoven fabric is lost so that it is not suited for used as an adhesive material for clothing.

By using, as at least one component of components of the thermoplastic polyurethane resin used in the present invention, a polymeric diol which has one or more methyl side chains, in particular has repeat units having a side chain in the molecule, it becomes possible to impart more excellent cold temperature flexibility, which is preferred. The cold temperature flexibility can be evaluated by a change between the hardness at normal temperature and that at cold temperature. A nonwoven fabric having excellent cold temperature flexibility is preferred because the pleasant feel to the touch is hardly deteriorated.

As the method preparing the thermoplastic polyurethane resin used in the present invention, for example, there can be employed any known methods of preparing the thermoplastic polyurethane resin, such as one shot method, prepolymer method, batch method, continuous method, extruder method, kneader method and the like. For example, according to the method using a kneader, a thermoplastic polyurethane resin in the form of flakes can be prepared by charging a polymeric diol and a chain-extending agent in a kneader, heating the mixture to 60° C., charging an aliphatic diisocyanate, reacting the mixture for 10 to 60 minutes, and cooling the resultant. A block can be ground into flakes by using a grinder. These flakes are optionally formed into pellets by extruder.

Use of a catalyst on the preparation of the thermoplastic polyurethane resin of the present invention is not necessary, however, there can be used tertiary amines such as triethylamine and triethylenediamine; carboxylates of these tertiary amines; organometallic salts such as naphthenic acid metal salts (e.g., cobalt naphthenate and copper naphthenate, etc.), octenic acid metal salts, tin oleate, dibuthyltin dilaurate and tin octenate; and alkyl phosphines such as triethyl phasphine, tributyl phosphine and the like.

In the thermoplastic polyurethane resin used in the present invention, there can be suitably added inorganic waxes, organic waxes, protein powders and other processing aids; antioxidants, ultraviolet inhibitors, antistats, organic plasticizers and other thermoplastic resins improving formability of nonwoven fabric; and coloring materials and matting agents.

As the method of producing the nonwoven fabric of the present invention, for example, a conventionally known method can be employed.

For example, fibers obtained by melting with heating using an extruder, injecting through melt blown nozzles having orifices arranged in line at a constant pitch at a proper spanning temperature, blowing a heated air from an air slit thereby to make the spun yarn thin, were collected on a belt conveyer made of a wire, said belt conveyer running under the spun yarn, thus obtaining a nonwoven fabric wherein the fibers collected on the belt conveyer have been fused with their own heat.

To improve the flexibility of the nonwoven fabric, it is preferred to adjust the softness of the nonwoven fabric within a proper range. In case of the nonwoven fabric of the present invention, the softness Y (mm) and the weight of the nonwoven fabric X (g/m$^2$) are preferably within the range which satisfies the expression: $Y \leq 0.2X+20$.

Furthermore, the fiber diameter of the nonwoven fabric is preferably 100 μm or less, more preferably 50 μm or less, and particularly 30 μm or less. The fiber diameter within the above range can maintain the proper flexibility, which is preferred.

A stretchable adhesive nonwoven fabric having a less softness can be obtained by using a thermoplastic polyurethane resin comprising an aliphatic diisocyanate, a polymeric diol and a chain-extending agent, at last one of which has one or more methyl side chain in the molecule. It can also be obtained by using a polymer having a low hardness (JIS-A hardness) of the thermoplastic polyurethane resin. However, when using a polymer having a low hardness, the release property from the conveyer belt is poor and it becomes impossible to stably produce even if the conveyer belt is coated with Teflon.

To improve the release property from the belt conveyer, the relationship between the melting temperature T and the melt viscosity V in the thermoplastic polyurethane resin used as a raw material may satisfy the following equation:

$$T = A \log (V) + B$$

wherein T is a melting temperature (°C.), V is a melt viscosity (poise), and A and B respectively satisfy the following equations:

$$-20 \leq A \leq -5,$$

$$100 \leq B \leq 250.$$

Another method of improving the release property include a method of ejecting fibers through melt blown nozzles and promoting solidification with cooling by adjusting the distance between the melt blown nozzles and the conveyer belt to 15cm or more and adjusting the temperature of the heated air through the air slit to the same as or lower than the melting temperature of the thermoplastic polyurethane, unlike conventional melt blown production conditions.

The adherends can be bonded with each other by sandwiching the nonwoven fabric of the present invention between the adherends and heating at a suitable temperature. Therefore, the nonwoven fabric of the present invention is useful for bonding fiber products such as cloth and nonwoven fabric, a fiber product with a polymeric material, or polymeric materials with each other.

Furthermore, when the air permeability Z (cc/cm$^2$/s) of the nonwoven fabric of the present invention and the weight X (g/m$^2$) of the nonwoven fabric satisfy the expression: $Z \geq 5700 \times 10^{-0.019X}$, the air permeability of the laminate after bonding with the adherend is improved, which is preferred.

General uses of the nonwoven fabric of the present invention include, for example, bonding of a permeable film, bonding of various escutcheons and marks, and heat-bonding of a pattern formed on one side of the nonwoven fabric of the present invention using a general copying machine onto clothes such as T-shirt.

Furthermore, various uses utilizing the flexibility and air permeability as characteristics of the present invention are suggested. For example, when using the nonwoven fabric of the present invention as an adhesive material on lamination and of knitted fabrics having excellent stretchability (e.g. two-way tricot) with each other, the laminate can be obtained without impairing the stretchability and air permeability of the tricot. On the other hand, when using a material such as copolymerized PET as an adhesive material, the stretchability of the tricot is lost.

When using the nonwoven fabric of the present invention on lamination and bonding of a knitted fabric and a permeable film, the laminate utilizing both benefits can be obtained without impairing the stretchability and properties of the knitted fabric.

When using the nonwoven fabric of the present invention to bond a flock-finishing mark, there can be obtained a product which has hardly been provided with the flexibility, heretofore.

Heretofore, twists and sag often occurred during the use because the adhesive was applied in a form of dots. However, these problems can be completely solved by using the nonwoven fabric to bond parts of a belt of inner products.

According to the present invention, it becomes possible to obtain a supporting fabric and an interliner of clothes, which has satisfactory stretchability that has hardly obtained heretofore and are excellent in form retention, thus making it possible to produce a tie having excellent form retention.

Non-organic polymeric materials such as metal plate, glass, etc. and paper can also be heat-bonded, thus making it possible to obtain laminates wherein these materials are bonded with a cloth.

EXAMPLES

The following Examples further illustrate the present invention in detail but are not to be construed to limit the scope thereof. First, measuring procedures of various physical properties are shown below.

(1) Hardness

Using specimens made by forming pellets by an injection molding machine under the conditions of 23° C. and 50% RH according to JIS K7311.

(2) Flow Initiating Temperature

A flow tester CFT-500 manufactured by Shimadzu Corp. was used. The process during which a solid specimen heated at a constant rate reaches a flow state through a rubber elastic state was continuously measured to determine the temperature at which the fluid initiates to flow through a nozzle (carried out under a load of 10 kgf using a nozzle of 1 mmφ1 mmL).

(3) Tensile Strength

Using a specimen of 2.5 cm×5 cm, the tensile strength was measured by stretching at a crosshead speed of 200 mm/min according to JIS L1096.

(4) 50% Stretch Elastic Recovery

Using a specimen of 2. 5 cm×5 cm, the 50% stretch elastic recovery was measured at a crosshead speed of 200 mm/min according to JIS L1096. Hereinafter, the stretch elastic recovery refers to this value.

(5) Release Strength

A sample made by bonding hot melt nonwoven fabrics was cut into pieces of 2.5 cm×15 cm as a specimen. Using a specimen of 2.5 cm×15 cm, the release strength was measured at a crosshead speed of 200 mm/min according to JIS L1086.

(6) Softness

Using a specimen of 2.0 cm×15 cm, the softness was measured according to JIS L1096 (cantilever method).

(7) Air Permeation Amount

An air permeability tester, Model KES-F8-AP1, manufactured by KATO TECH Co., Ltd. was used. After a specimen of 12cm×12 cm in size was fixed to the tester, air permeation resistance was read for 6 seconds (3 seconds for exhaust and 3 seconds for intake) and then calculated based on a Conventional Franzier air permeability tester.

Example 1

A thermoplastic polyurethane resin prepared from an adipate type polyester polyol, an amido wax type lubricant, 1,4-butanediol and 1,6-hexamethylene diisocyanate, and a weathering agent was used as a thermoplastic polyurethane. The polyurethane resin had a hardness (JIS-A hardness) of 85 degree and a flow initiating temperature of 104° C. Fibers, which were obtained by melting the urethane resin with heating, ejecting through melt blown nozzles having 100 orifices (0.5 mm φ) arranged in line at a pitch of 1 mm at a spinning temperature of 210° C. and blowing a heated air at 205° C. through an air slit having a slit width of 0.5 mm thereby to make the spun yarn thin, were collected on a belt conveyer made of a Teflon-coated wire, said belt conveyer running at the position of 20 cm under the spun yarn, and then fused with their own heat to obtain a nonwoven fabric having a weight of 50 g/m$^2$.

This nonwoven fabric was a soft and stretchable adhesive nonwoven fabric having a fiber diameter of 254μm, a warp tensile strength of 300 gf/2.5 cm, a weft tensile strength of 285 gf/2.5 cm, a 50% stretch elastic recovery of 83%, a softness of 23 mm, and an air permeation amount of 830 cc/cm$^2$/s.

The above nonwoven fabric was sandwiched between nylon two-way tricots having an air permeation amount of 80 cc/cm$^2$/s, followed by bonding with heat-pressing. This material had an air permeation amount of 8.7 cc/cm$^2$/s, a softness of 43 mm, a 50% stretch elastic recover of 80%, a release strength of 3500 g/2.5 cm. It had excellent flexibility, stretchability, air permeability and bonding strength (Sample A).

The same test was carried out, except that the air permeation amount and softness of the nonwoven fabric were changed by changing the production conditions of the above nonwoven fabric (Samples B and C). Furthermore, the same measurement was carried out, except for using a polyamide type hot melt nonwoven fabric (manufactured by Japan Vilene Co., Ltd., 50 g/m$^2$) and a urethane film (Nippon Miractran Co., Ltd., 30 μm) as a control for comparison (Samples D and E).

The air permeation amount and softness of the samples used in each test are summarized in Table 1.

In addition, the air permeability, flexibility and stretchability were evaluated by using samples and nylon two-way tricot according to the following procedures. The results are summarized in table 2.

<Evaluation of Air Permeability>

◯:Air permeation amount of not less than 3.0 cc/cm$^2$/s

Δ: Air permeation amount of not less than 1.0 and less than 3.0

×: Air permeation amount of less than 1.0

<Evaluation of flexibility>

◯: Softness of not less than 45 mm

Δ: Softness of not less than 45 mm and less than 55 mm

×: Softness of less than 55 mm

<Evaluation of stretchability>

◯: Stretchability of not less than 50% and stretch elastic recovery of not less than 70%

Δ: Stretchability of not less than 50% and stretch elastic recovery of less than 70%

×: Stretchability of less than 30%

TABLE 1

| Test | Samples | Air permeability (cc/cm$^2$/s) | Softness (mm) |
|------|---------|-------------------------------|---------------|
| A | Product of the present invention | 830 | 23 |
| B | Product of the present invention | 300 | 21 |
| C | Product of the present invention | 1000 | 35 |
| D | Polyamide | 520 | 58 |

TABLE 1-continued

| Test | Samples | Air permeability (cc/cm²/s) | Softness (mm) |
|---|---|---|---|
| E | nonwoven fabric Urethane Film | 0 | 17 |

TABLE 2

| Test | Air permeability | Flexibility | Stretchability |
|---|---|---|---|
| A | ○ | ○ | ○ |
| B | Δ | ○ | ○ |
| C | ○ | Δ | ○ |
| D | ○ | X | X |
| E | X | ○ | ○ |

Example 2

A thermoplastic polyurethane resin (A) prepared from an adipate type polyester polyol, 1,4-butanediol and 1,6-hexamethylene diisocyanate, and an amido wax type lubricant and a weathering agent was mixed with a thermoplastic polyurethane resin (B) prepared from an adipate type polyester polyol, 1,4-butanediol and 4,4,'-diphenylmethane diisocyanate, and an amido wax type lubricant and a weathering agent in a blender and the mixture was kneaded in an extruder at 170° C. to obtain pellets, which were used as a thermoplastic polyurethane resin. This resin had a hardness of 90 and a flow initiating temperature of 120° C. Using the resin, an adhesive nonwoven fabric of 35 g/m² was obtained in the same manner as in Example 1.

This nonwoven fabric was a soft and stretchable adhesive nonwoven fabric having a fiber diameter of 205 μm, a warp tensile strength of 290 gf/2.5 cm and a weft tensile strength of 265 gf/2.5 cm, a 50% stretch elastic recovery of 86%, a softness of 19 mm, and an air permeation amount of 1200 cc/cm²/s.

Example 3

A thermoplastic polyurethane resin prepared from polybutylene adipate, poly 3-methyl-1,5-pentan adipate, 1,4-butanediol and 1,6-hexamethylene diisocyanate, and an amido wax type lubricant, a weathering agent and dibutyltin laurate as a catalyst was extruded in an extruder at 160° C. to obtain pellets, which were used as a thermoplastic polyurethane resin. These pellets had a hardness of 80 and a flow initiating temperature of 97° C. Using the pellets, an adhesive nonwoven fabric of 20 g/m² was obtained in the same manner as in Example 1.

This nonwoven fabric was a soft and strechable adhesive nonwoven fabric having a fiber diameter of 20 μm, a warp tensile strength of 149 gf/2.5 and a weft tensile strength of 111 gf/2.5 cm, a 50% stretch elastic recovery of 87%, a softness of 16mm and an air permeation amount of 2600 cc/cm²/s.

INDUSTRIAL APPLICABILITY

The nonwoven fabric of the present invention is suited for use as an adhesive fabric for fiber products because of excellent flexibility and strong adhesive strength. The fiber laminate of the present invention is particularly suited for clothing items because of excellent air permeability.

What is claimed is:

1. A stretchable adhesive nonwoven fabric made of a thermoplastic polyurethane resin formed into fibers, said thermoplastic polyurethane resin comprising an aliphatic diisocyanate and/or an aromatic diisocyanate, a polymeric diol and a chain extending agent, characterized in that a hardness (JIS-A hardness) is from 65 to 98 degree and a flow initiating temperature is from 80 to 150° C.

2. The stretchable adhesive nonwoven fabric according to claim 1, wherein the thermoplastic polyurethane resin is a mixture of a thermoplastic polyurethane resin (A) comprising an aliphatic diisocyanate, a polymeric diol and a chain-extending agent and a thermoplastic polyurethane resin (B) comprising an aromatic diisocyanate, a polymeric diol and a chain-extending agent.

3. The stretchable adhesive nonwoven fabric according to claim 1, wherein the thermoplastic polyurethane resin comprises an aliphatic diisocyanate, a polymeric diol and a chain-extending agent, at least one component of which has one or more methyl side chains in the molecule.

4. The stretchable adhesive nonwoven fabric according to claim 1, which is prepared by laminating substantially continuous filaments into a sheet and fusion-bonding the filaments themselves with their own heat at the contact point of the laminated filaments, wherein the softness is represented by the formula:

$$Y \leq 0.2X + 20$$

wherein Y is a softness (mm) and X is a weight (g/m²) of a nonwoven fabric, and a fiber diameter is not more than 100 μm.

5. The stretchable adhesive nonwoven fabric according to claim 1, wherein the air permeation amount Z (cc/cm²/s) as a function of the weight X (g/m²) is within the following range:

$$Z \geq 5700 \times 10^{-0.019X}, \text{ provided that } 10 \leq X \leq 100.$$

6. A laminate comprising the nonwoven fabric of any one of claims 1 to 5 as an intermediate layer and the same or different adherends as upper and lower layer, said laminate being prepared by laminating the nonwoven fabric with the adherends and heat-bonding them.

7. The laminate according to claim 6, wherein the adherend is selected from the group consisting of sheet, film, cloth, nonwoven fabric and paper.

* * * * *